United States Patent
Turtinen et al.

(10) Patent No.: US 12,363,762 B2
(45) Date of Patent: Jul. 15, 2025

(54) TIMING ADVANCE GROUP INDICATION

(71) Applicant: Nokia Technologies Oy, Espoo (FI)

(72) Inventors: Samuli Heikki Turtinen, Ii (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/930,397

(22) Filed: Oct. 29, 2024

(65) Prior Publication Data
US 2025/0106900 A1  Mar. 27, 2025

Related U.S. Application Data

(63) Continuation of application No. 18/888,297, filed on Sep. 18, 2024.

(51) Int. Cl.
*H04W 74/0833*  (2024.01)

(52) U.S. Cl.
CPC .............................. *H04W 74/0833* (2013.01)

(58) Field of Classification Search
CPC ................................................ H04W 74/0833
See application file for complete search history.

(56) References Cited

U.S. PATENT DOCUMENTS

| | | | | |
|---|---|---|---|---|
| 2020/0344812 | A1* | 10/2020 | Agiwal | H04L 5/0055 |
| 2024/0080784 | A1* | 3/2024 | Lin | H04W 56/0045 |
| 2024/0205854 | A1* | 6/2024 | Guo | H04W 56/0045 |
| 2024/0214960 | A1* | 6/2024 | Prasad | H04W 56/0045 |

OTHER PUBLICATIONS

Shinya Kumagai et al., "Discussion on two TAs for multi-DCI", 3GPP Draft, R1-2301478 vol. RAN WG1, no. Athens, GR:20230227-20230303 Feb. 17, 2023 (Feb. 17, 2023, XP052248610.
Nokia et al., "RA procedure while SpCell is configured with 2 TAGs" 3GPP Draft, R2-2305752 vol. 3GPP RAN 2, No. Incheon, South Korea, 20230522-20230526 May 12, 2023 (May 12, 2023), XP052390599.
Intel Corporation, "Discussion on 1-14 multi-DCI multi-TRP with two TAs", 3GPP Draft, R2-2302692, 3rd Generation. Paartnership Project (3GPP), Mobile Competence Centre, Apr. 7, 2023, 650.

* cited by examiner

*Primary Examiner* — Brian D Nguyen
(74) *Attorney, Agent, or Firm* — McCarter & English, LLP

(57) ABSTRACT

Embodiments of the present disclosure relate to devices, methods, apparatuses and computer readable storage media of blind user equipment (UE) specific timing advance group (TAG) indication. The method comprises: determining, at a first apparatus, whether an association between at least one TAG associated with a SpCell of the first apparatus and respective one or more indices in an RAR is obtained from a second apparatus; and determining, based on the determination of the association, an applicability of the RAR for a random access procedure of the first apparatus.

16 Claims, 5 Drawing Sheets

TIMING ADVANCE GROUP INDICATION

CROSS REFERENCE TO RELATED APPLICATION

This is a continuation application of U.S. patent application Ser. No. 18/888,297, filed Sep. 18, 2024, the contents of which are hereby incorporated by reference in its entirety.

FIELDS

Various example embodiments of the present disclosure generally relate to the field of telecommunication and in particular, to methods, devices, apparatuses and computer readable storage medium for timing advance group (TAG) indication, especially for the blind user equipment (UE) specific TAG indication.

BACKGROUND

The main objectives for the Multiple Input Multiple Output (MIMO) enhancement may involve beam management, multiple transmission and reception point (mTRP) for ultra-reliable, low-latency communication (URLLC), mTRP for enhanced mobile broadband (eMBB) and Time Division Duplexing (TDD)/Frequency Division Duplexing (FDD) reciprocity.

SUMMARY

In a first aspect of the present disclosure, there is provided a first apparatus. The first apparatus comprises at least one processor; and at least one memory storing instructions that, when executed by the at least one processor, cause the first apparatus at least to: determine whether an association between at least one TAG associated with a special cell (SpCell) of the first apparatus and respective one or more indices in a random access response (RAR) is obtained from a second apparatus; and determine, based on the determination of the association, an applicability of the RAR for a random access procedure of the first apparatus.

In a second aspect of the present disclosure, there is provided a second apparatus. The second apparatus comprises at least one processor; and at least one memory storing instructions that, when executed by the at least one processor, cause the second apparatus at least to: configure, to a first apparatus, an association between at least one TAG associated with a SpCell of the first apparatus and respective one or more indices in an RAR.

In a third aspect of the present disclosure, there is provided a method. The method comprises: determining, at a first apparatus, whether an association between at least one TAG associated with a SpCell of the first apparatus and respective one or more indices in an RAR is obtained from a second apparatus; and determining, based on the determination of the association, an applicability of the RAR for a random access procedure of the first apparatus.

In a fourth aspect of the present disclosure, there is provided a method. The method comprises: configuring, from a second apparatus to a first apparatus, an association between at least one TAG associated with a SpCell of the first apparatus and respective one or more indices in an RAR.

In a fifth aspect of the present disclosure, there is provided a first apparatus. The first apparatus comprises means for determining whether an association between at least one TAG associated with a SpCell of the first apparatus and respective one or more indices in an RAR is obtained from a second apparatus; and means for determining, based on the determination of the association, an applicability of the RAR for a random access procedure of the first apparatus.

In a sixth aspect of the present disclosure, there is provided a second apparatus. The second apparatus comprises means for configuring, to a first apparatus, an association between at least one TAG associated with a SpCell of the first apparatus and respective one or more indices in an RAR.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
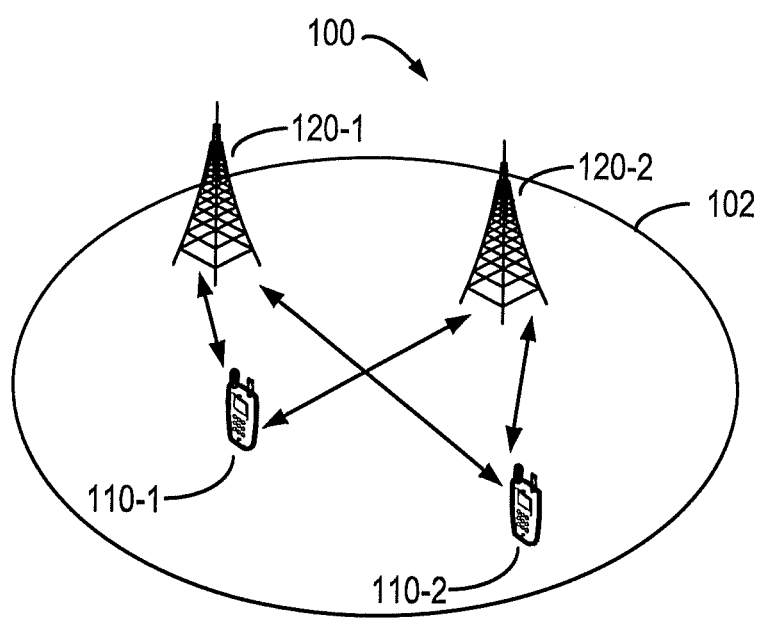
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptopmounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "transmission reception point (TRP)" may refer to an antenna port or an antenna array (with one or more antenna elements) available to the network device located at a specific geographical location. For example, a network device may be coupled with multiple TRPs in different geographical locations to achieve better coverage. Alternatively, or in addition, multiple TRPs may be incorporated into a network device, or in other words, the network device may comprise the multiple TRPs. The term "TRP" may be also referred to as a cell, such as a macro-cell, a small cell, a pico-cell, a femto-cell, a remote radio head, a relay node, etc. It is to be understood that the term "TRP" may refer to a logical concept which may be physically implemented by various manner. For example, a TRP may refer to or correspond to a physical cell identity (PCI) or control resource set (CORESET) Pool Index (i.e., CORESETPoolIndex). In example embodiments of the present disclosure, the term "TRP" can be used interchangeably with the terms "PCI" or "CORESETPoolIndex".

FIG. 1 shows an example communication network 100 in which embodiments of the present disclosure may be implemented. As shown in FIG. 1, the communication network 100 may include a first apparatus 110-1 and a first apparatus 110-2. Each of the first apparatus 110-1 and the first apparatus 110-2 may be referred to as a terminal device (e.g., a UE). Hereinafter the first apparatus 110-1 and the first apparatus 110-2 may be referred to as a first apparatus 110 collectively.

The communication network 100 may further a second apparatus 120-1 and a second apparatus 120-2. Each of the second apparatus 120-1 and the second apparatus 120-2 may be referred to as a network device (e.g., a gNB or a TRP). Hereinafter the second apparatus 120-1 and the second apparatus 120-2 may be referred to as a second apparatus 120 collectively.

Both the second apparatus 120-1 and the second apparatus 120-2 may serve the first apparatus 110. That is, each of the second apparatus 120-1 and the second apparatus 120-2 may serve the first apparatus 110 within its serving cell. In this case, the serving cell associated with the second apparatus 120-1 and the serving cell associated with the second apparatus 120-2 may be referred to as a SpCell 102 of the first apparatus 110. The SpCell may be referred to as a primary cell (PCell) and/or a primary secondary cell (PS-Cell).

In some scenario, the first apparatus 110 may be configured with multi-TRPs (MTRP), for example, a first TRP (e.g., the second apparatus 120-1) and a second TRP (e.g., the second apparatus 120-2) within a SpCell of the first apparatus 110.

When the first apparatus 110 communicates with the second apparatus 120 within a serving cell, it is to be understood that the first apparatus 110 may communicate with the one of or both the first TRP and the second TRP. For example, the terminal device may be allowed to transmit and/or receive control information and data from the first TRP and the second TRP.

It is to be understood that the number of network devices and terminal devices shown in FIG. 1 is given for the purpose of illustration without suggesting any limitations. The communication network 100 may include any suitable number of network devices and terminal devices.

In some example embodiments, links from the second apparatus 120 to the first apparatus 110 may be referred to as a downlink (DL), while links from the first apparatus 110 to the second apparatus 120 may be referred to as an uplink (UL). In DL, the second apparatus 120 is a transmitting (TX) device (or a transmitter) and the first apparatus 110 is a receiving (RX) device (or receiver). In UL, the first apparatus 110 is a TX device (or transmitter) and the second apparatus 120 is a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As discussed above, MIMO has been widely used in current wireless communication system. Specifically, MIMO is one of the key technologies in the NR systems and is successful in commercial deployment. MIMO features were investigated and specified for both frequency division duplexing (FDD) and time division duplexing (TDD) systems, of which major parts were for downlink MIMO operation.

It is important to identify and specify necessary enhancements for UL MIMO, while necessary enhancements on downlink MIMO that facilitate the use of large antenna array, not only for frequency range 1 (FR1) but also for frequency range 2 (FR2), would still need to be introduced to fulfil the request for evolution of NR deployments. This comprises the following areas of enhancement.

First, significant loss of performance for a UE at high/medium speed has been observed in commercial deployments especially in multi-user MIMO (MU-MIMO) scenarios. As the performance loss is partly caused by outdated channel state information (CSI), enhancements on CSI acquisition to alleviate such loss can be beneficial.

Second, the unified transmission configuration indicator (TCI) framework was introduced which facilitates streamlined multi-beam operation targeting FR2. As focusing on single-TRP use cases, extension of unified TCI framework that focuses on multi-TRP use cases is beneficial.

Third, due to the increasing need for multiplexing capacity of downlink and uplink demodulation reference signal (DMRS) from various use cases, there is a need for increasing the number of orthogonal ports for DMRS.

Fourth, features for facilitating multi-TRP deployments have been introduced focusing on non-coherent joint transmission (NC-JT). As coherent joint transmission (CJT) improves coverage and average throughput in commercial deployments with high-performance backhaul and synchronization, enhancement on CSI acquisition for FDD and TDD, targeting FR1, can be beneficial in expanding the utility of multi-TRP deployments.

Fifth, as advanced UEs (for example, Customer Premise Equipment (CPE), fixed wireless access (FWA), vehicle, industrial devices) become more relevant, introducing necessary enhancements to support for 8 antenna ports as well as 4 and more layers for UL transmission can offer the needed improvement for UL coverage and average throughput.

Sixth, with the introduction of features for UL panel selection, advanced UEs (for example, CPE, FWA, vehicle, industrial devices) can benefit from higher UL coverage and average throughput with simultaneous UL multi-panel transmission. Finally, some further enhancement to facilitate UL multi-TRP deployments via two TAs and enhanced UL power control can offer additional UL performance improvement.

Furthermore, a study of two timing advances (TAs) for UL multi-downlink control information (DCI) for multi-TRP operation has been discussed.

It is agreed that with two TAs for DCI for multi-TRP operation, the UE may be configured with two TAGs per serving cell.

The corresponding agreement may indicate the following:

For multi-DCI based multi-TRP operation with two TAs, support configuring two TAGs belonging to a serving cell.

For intra-cell multi-DCI based Multi-TRP operation with two $T_A$ enhancement and physical downlink control channel (PDCCH) order Contention Free Random Access (CFRA), indicate a representation of the TAG identifier (ID) with 1 bit (either the first TAG ID or the second TAG ID for the serving cell) as part of $T_A$ command in RAR.

For intra-cell multi-DCI based Multi-TRP operation, only a single NTA, offset is configured.

It is also agreed that for Contention Based Random Access (CBRA), the mechanism for CFRA case can be used, i.e., use the random access (RA) RAR to indicate the TAG.

This means that when the UE performs RA procedure towards a serving cell configured with 2 TAGs (for CBRA, it is always on a SpCell, i.e., either PCell or PSCell, the network (NW) indicates over an indication in the RAR the TAG for which the RAR applies to. The common understanding is that the R bit in the medium access control (MAC) payload for RAR may be used for this indication.

A MAC RAR is octet aligned and consists of the following fields:

R: Reserved bit, set to 0;

Timing Advance Command (TAC): The Timing Advance Command field indicates the index value $T_A$ used to control the amount of timing adjustment that the MAC entity has to apply. The size of the Timing Advance Command field is 12 bits;

UL Grant: The Uplink Grant field indicates the resources to be used on the uplink. The size of the UL Grant field is 27 bits;

Temporary C-RNTI: The Temporary Cell-Radio Network Temporary Identifier (C-RNTI) field indicates the temporary identity that is used by the MAC entity during Random Access. The size of the Temporary C-RNTI field is 16 bits.

As discussed above, when the CBRA procedure is performed, the NW identifies the UE only after a Message 3 (Msg3) transmission of the RA procedure has been received from the UE. This results to an issue in indicating the associated TAG in the RAR (e.g., Message 2 (Msg2)) of the RA procedure when two UEs within the same serving cell have different TAG ID associated with the same TRP of the cell.

For example, as shown in FIG. 1, this can happen when the first apparatus 110-1 (e.g., a first UE) performs initial access to a beam provided by second apparatus 120-1 (e.g., a first TRP), the first $T_{A\ \#}0$ provided to the first apparatus 110-1 may be associated with TAG #0 (towards second apparatus 120-1) while the additional $T_A$ of the second apparatus 120-2 (e.g., a second TRP) may be further associated with TAG #1/2/3.

On the other hand, the first apparatus 110-2 (e.g., a second UE) may perform initial access to a beam provided by second apparatus 120-2 (e.g., a second TRP), the first TA #0 provided to the first apparatus 110-2 may be associated with TAG #0 (towards second apparatus 120-2) while the additional $T_A$ of the second apparatus 120-1 (e.g., a first TRP) could be further associated with TAG #1/2/3.

Therefore, as the NW does not know which UE transmitted the preamble upon receiving a preamble over random access channel (RACH), the NW does not know whether the UE is configured with multiple TAGs for the serving cell, and if yes, the NW does not know which TAG ID is associated for the given TRP for the UE either.

According to some example embodiments of the present disclosure, there is provided a solution for blind UE specific TAG indication. In this solution, the first apparatus 110 determines whether an association between at least one TAG associated with a SpCell of the first apparatus 110 and respective one or more indices in an RAR is obtained from the second apparatus 120. Based on the determination of the association, the first apparatus 110 determines an applicability of the RAR for a random access procedure of the first apparatus 110.

In this way, NW does not need to identify the UE to be able to indicate the proper TAG for the UE over the RAR if the UE is configured with two TAGs for its SpCell.

Example embodiments of the present disclosure will be described in detail below with reference to the accompanying drawings.

Figure 2:
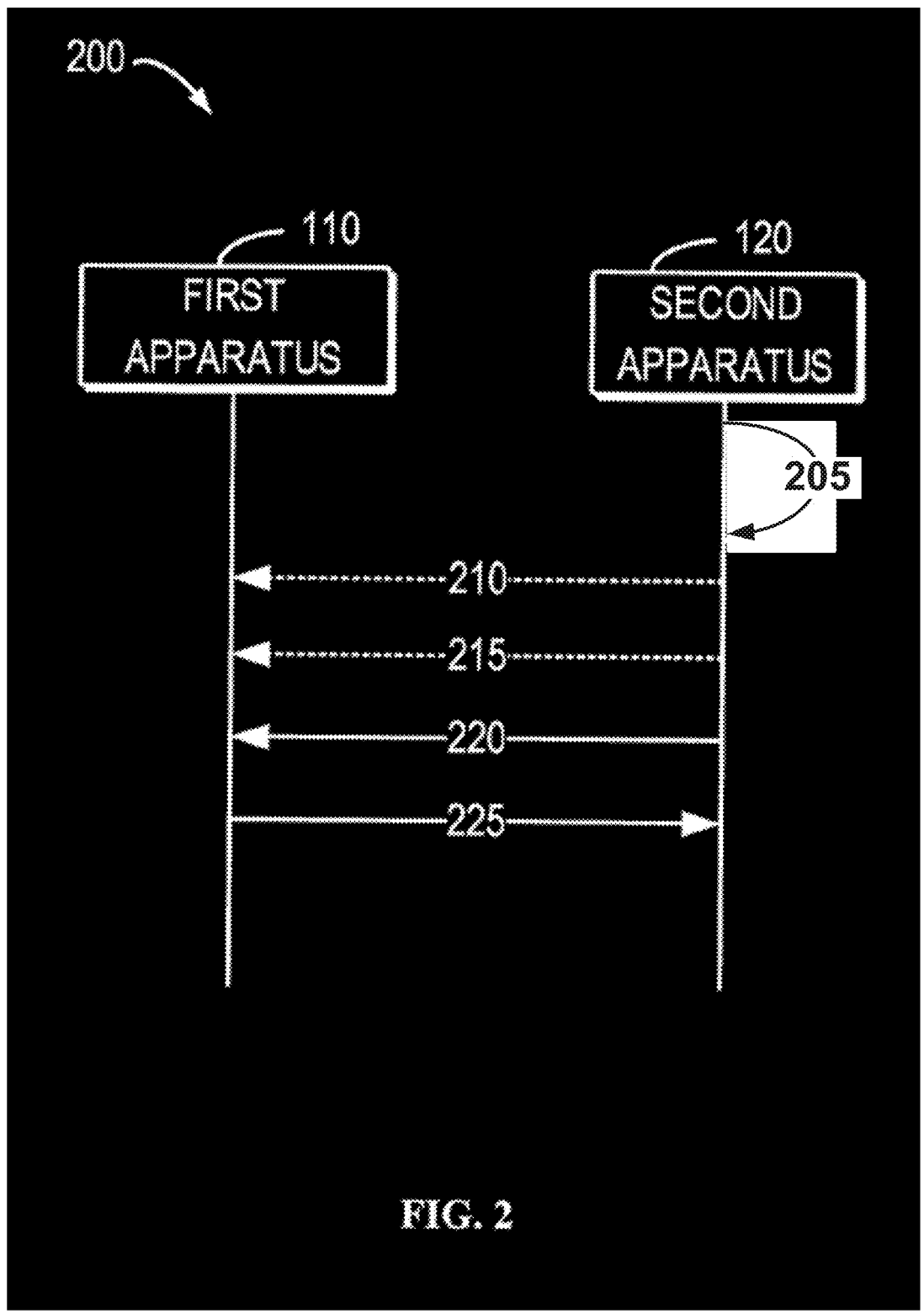
FIG. 2 illustrates a signaling chart illustrating an example of process according to some example embodiments of the present disclosure.

Reference is now made to FIG. 2, which shows a signaling chart 200 for communication according to some example embodiments of the present disclosure. As shown in FIG. 2, the signaling chart 200 involves the terminal device 110 and the network device 120. For the purpose of discussion, reference is made to FIG. 1 to describe the signaling chart 200.

In some scenarios related to FIG. 2, at least two TAGs associated with the SpCell 102 of the first apparatus 110 may be configured for the first apparatus 110.

In some embodiments, the first apparatus 110 may be configured (205), by the second apparatus 120, an association between at least one TAG associated with the SpCell 102 of the first apparatus 110 and respective one or more indices in an RAR.

For example, the first apparatus 110 may obtain (210) the association upon configuring a second TAG for the first apparatus 110. That is, the second apparatus 120 may provide/configure the association between each TAG (e.g., of the two TAGs) associated with the SpCell and an indication (e.g., an index) over RAR. This association may indicate i.e., which TAG is applicable to which index value of the indication in RAR.

It is to be understood that the index in the RAR or the indication in the RAR, in some embodiments, may be indicated by a value of a bit field in the RAR. In some examples, the index in the RAR or the indication in the RAR may be indicated by a value of a bit field in the UL grant field of the RAR.

As another example, if there is no second TAG, the first apparatus 110 may obtain (215) the association between the first TAG and a corresponding index in the RAR. For example, the second apparatus 120 may configure such association, i.e., between the first TAG and a corresponding index in the RAR, upon an initial configuration of the first apparatus 110.

For the association between the at least one TAG and respective one or more indices/indications, the second apparatus 120 may only configure an association between one TAG associated with the SpCell of the first apparatus 110 and an index having a specific index value (e.g., value #1) in the RAR. The first apparatus 110 may determine that the other TAG associated with the SpCell of the first apparatus 110 is indicated by an index having another index value (e.g., value #0) in the RAR.

Optionally or alternatively, the indication in RAR is always interpreted in a certain way. For example, the lower index value (e.g., value #0) of the indication in RAR may always be mapped to a TAG with lower TAG index value (e.g., TAG ID #0) while the higher index value (e.g., #1) of the indication in RAR may always be mapped to a TAG with higher TAG index value (e.g., TAG ID #2) of the first apparatus 110.

In this situation, in some embodiments, the second apparatus 120 may have to ensure the TAG IDs for first apparatus(es) 110 configured with two TAGs for SpCell are configured appropriately. For example, upon configuring the second TAG associated with SpCell for the first apparatus 110, the second apparatus 120 may need to reconfigure the TAG ID #0 to the second TAG and configure a new TAG ID (e.g., TAG ID #2) for the first TAG of the first apparatus 110.

The second apparatus 120 may transmit (220) an RAR (e.g., in a RA procedure) to the first apparatus 110. The first apparatus 110 may determine a TAG indication (e.g., an index) in the RAR.

In some embodiments, if the first apparatus 110 determines that the received RAR indicates an index corresponding to a TAG associated with the SpCell of the first apparatus based on the configured association, the first apparatus 110 may determine that this received RAR can be applied for the RA procedure. That is, only if the indication (e.g., an index) in RAR corresponds to the configured value for a TAG of the first apparatus 110, the first apparatus 110 will apply (225) this RAR during a RA procedure.

Otherwise, the first apparatus 110 may not apply the received RAR for the RA procedure, until the first apparatus 110 receives an RAR including an indication (e.g., an index) corresponds to the configured value for its TAG.

In some other embodiment, it is also possible that there is no configuration for a second TAG nor corresponding index in a received RAR, in this case, the first apparatus 110 may ignore the indication in RAR (or considers it as reserved bit) and always applies (225) the RAR for the RA procedure.

Figure 3:
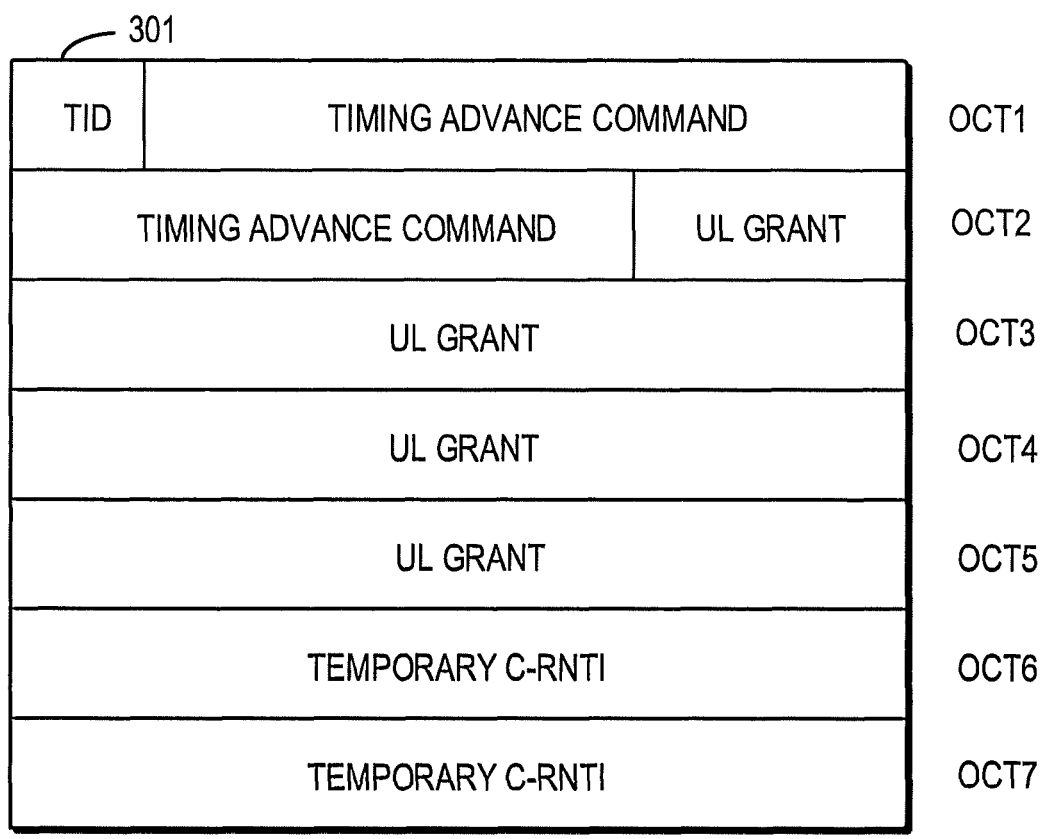
FIG. 3 illustrates an example of message format including a TAG indication according to some example embodiments of the present disclosure.

FIG. 3 illustrates an example of message format including a TAG indication according to some example embodiments of the present disclosure.

In some embodiments, an index associated to a TAG ID of a TAG associated with a SpCell of the first apparatus 110 may be included in the TID field 301 of a MAC payload for RAR. For example, if the TID field 301 indicates, in an RAR received by the first apparatus 110, an index has an index value #1, which is associated with a TAG #1 associated with a SpCell of the first apparatus 110, the first apparatus 110 may apply this RAR for the RA procedure.

Based on the proposed solution of the present disclosure, various embodiments proposed in this present disclosure may be implemented into the MAC specification. Different alternative implementations associated with the TID field in the RAR for the MAC specification may be listed as below:

---

The MAC RAR fixed size as depicted in FIG. 3 and consists of the following fields:

TID: This field indicates the TAG to which the Timing Advance Command applies to in case the SpCell of the MAC entity is associated with two TAGs; otherwise, this field is reserved bit, set to 0. TID field set to 1 indicates the TAG associated with the SpCell with tagID-rarAssociation set to true and TID field set to 0 indicates the other TAG associated with the SpCell.

TID: This field indicates the TAG to which the Timing Advance Command applies to in case the SpCell of the MAC entity is associated with two TAGs; otherwise, this field is reserved bit, set to 0. TID field set to 1 indicates the TAG associated with the SpCell with tagID-rarAssociation set to true and TID field set to 0 indicates the other TAG associated with the SpCell with tagID-rarAssociation set to false.

TID: This field indicates the TAG to which the Timing Advance Command applies to in case the SpCell of the MAC entity is associated with two TAGs; otherwise, this field is reserved bit, set to 0. The MAC entity determines the TAG indicated by the TID field according to the higher layer configuration tagID-rarAssociation.

---

Although the solutions of the present disclosure have been described with a 4-step RA procedure (i.e., the Msg2 in the 4-step RA procedure), it is to be understood that these may also be applied for 2-step RA MSGB and/or fallback RAR as well.

By applying the example embodiments of the present disclosure, NW does not need to identify the UE to be able to indicate the proper TAG for the UE over the RAR if the UE is configured with two TAGs for its SpCell.

Figure 4:
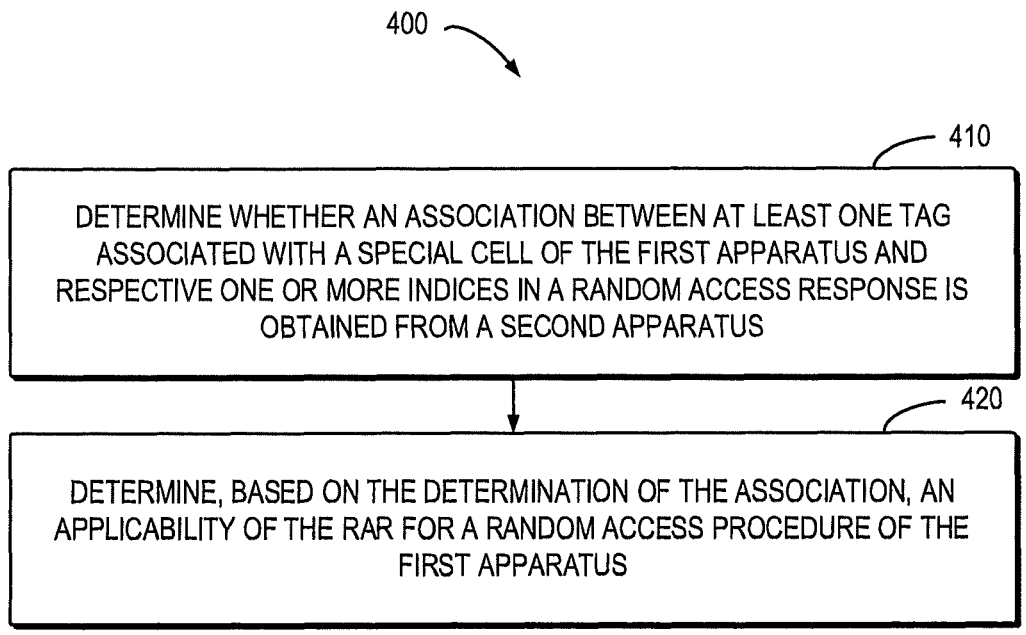
FIG. 4 illustrates a flowchart of a method implemented at a first apparatus according to some example embodiments of the present disclosure.

FIG. 4 shows a flowchart of an example method 400 implemented at a first apparatus in accordance with some example embodiments of the present disclosure. For the purpose of discussion, the method 400 will be described from the perspective of the first apparatus 110 in FIG. 1.

At block 410, the first apparatus 110 determines whether an association between at least one TAG associated with a SpCell of the first apparatus and respective one or more indices in an RAR is obtained from a second apparatus.

At block 420, the first apparatus 110 determines, based on the determination of the association, an applicability of the RAR for a random access procedure of the first apparatus.

In some example embodiments, the first apparatus is capable of being configured with two TAGs associated with the SpCell.

In some example embodiments, the method 400 further comprises: obtaining the association upon configuring a second TAG for the first apparatus.

In some example embodiments, the method 400 further comprises: obtaining the association between a first TAG and a corresponding index in the RAR when there is no configuration of a second TAG.

In some example embodiments, the method 400 further comprises: in accordance with a determination, based on the association, that a received RAR indicates an index corresponding to a TAG associated with the SpCell of the first apparatus, determine that the RAR is to be applied for the random access procedure.

In some example embodiments, the method 400 further comprises: in accordance with a determination, based on the association, that a received RAR does not indicate an index corresponding to a TAG associated with the SpCell of the first apparatus, determine that the RAR is not to be applied for the random access procedure.

In some example embodiments, the method 400 further comprises: obtaining the association between a TAG associated with SpCell and an index in the RAR having a specific index value; and determining that a further TAG associated with SpCell is associated to a further index in the RAR having another index value.

In some example embodiments, a lower index value in the RAR is associated to a TAG having a lower group identifier and a higher index value in the RAR is associated to a TAG having a higher group identifier.

In some example embodiments, the method 400 further comprises: in accordance with a determination that there is no configuration of a second TAG nor corresponding index in a received RAR, determining that the RAR is to be applied for the random access procedure.

In some example embodiments, an index in the RAR is indicated by a value of a bit field in the RAR.

In some example embodiments, the first apparatus comprise a terminal device and the second apparatus comprises a network device.

Figure 5:
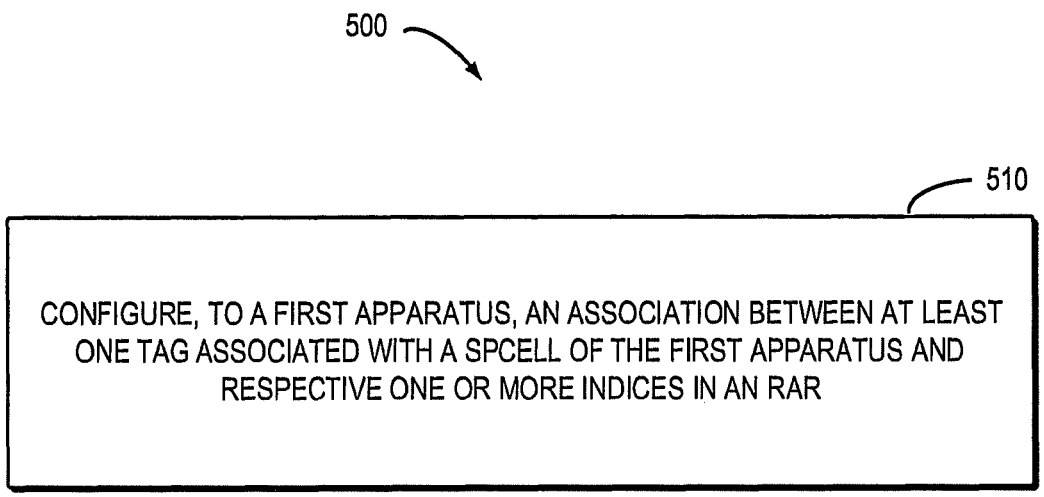
FIG. 5 illustrates a flowchart of a method implemented at a second device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second apparatus 120 in FIG. 1.

At block 510, the second apparatus 120 configures, to a first apparatus, an association between at least one TAG associated with a SpCell of the first apparatus and respective one or more indices in an RAR.

In some example embodiments, the first apparatus is capable of being configured with two TAGs associated with the SpCell.

In some example embodiments, the method 500 further comprises: configuring the association to the first apparatus upon configuring a second TAG for the first apparatus.

In some example embodiments, the method 500 further comprises: configuring the association between a first TAG and a corresponding index in the RAR to the first apparatus when there is no configuration of a second TAG.

In some example embodiments, the method 500 further comprises: configuring, to the first apparatus, a TAG associated with SpCell and an index in the RAR having a specific index value.

In some example embodiments, a lower index value in the RAR is associated to a TAG having a lower group identifier and a higher index value in the RAR is associated to a TAG having a higher group identifier.

In some example embodiments, the method 500 further comprises: in responding to configuring the TAG having the lower group identifier associated to the higher index value, re-configure the TAG having the lower group identifier associated to the lower index value when configuring the TAG having the higher group identifier.

In some example embodiments, an index in the RAR is indicated by a value of a bit field in the RAR.

In some example embodiments, the first apparatus comprise a terminal device and the second apparatus comprises a network device.

In some example embodiments, a first apparatus capable of performing any of the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises means for determining whether an association between at least one TAG associated with a SpCell of the first apparatus and respective one or more indices in an RAR is obtained from a second apparatus; and means for determining, based on the determination of the association, an applicability of the RAR for a random access procedure of the first apparatus.

In some example embodiments, the first apparatus is capable of being configured with two TAGs associated with the SpCell.

In some example embodiments, the first apparatus further comprises: means for obtaining the association upon configuring a second TAG for the first apparatus.

In some example embodiments, the first apparatus further comprises: means for obtaining the association between a first TAG and a corresponding index in the RAR when there is no configuration of a second TAG.

In some example embodiments, the first apparatus further comprises: means for in accordance with a determination, based on the association, that a received RAR indicates an index corresponding to a TAG associated with the SpCell of the first apparatus, determine that the RAR is to be applied for the random access procedure.

In some example embodiments, the first apparatus further comprises: means for in accordance with a determination, based on the association, that a received RAR does not indicate an index corresponding to a TAG associated with the SpCell of the first apparatus, determine that the RAR is not to be applied for the random access procedure.

In some example embodiments, the first apparatus further comprises: means for obtaining the association between a TAG associated with SpCell and an index in the RAR having a specific index value; and means for determining that a further TAG associated with SpCell is associated to a further index in the RAR having another index value.

In some example embodiments, a lower index value in the RAR is associated to a TAG having a lower group identifier and a higher index value in the RAR is associated to a TAG having a higher group identifier.

In some example embodiments, the first apparatus further comprises: means for in accordance with a determination that there is no configuration of a second TAG nor corresponding index in a received RAR, determining that the RAR is to be applied for the random access procedure.

In some example embodiments, an index in the RAR is indicated by a value of a bit field in the RAR.

In some example embodiments, the first apparatus comprise a terminal device and the second apparatus comprises a network device.

In some example embodiments, the first apparatus further comprises means for performing other operations in some example embodiments of the method 400 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second apparatus 120 in FIG. 1) may comprise means for performing the respective operations of the method 500. The means may be implemented in any suitable form. For example, the means may be implemented in a circuitry or software module. The second apparatus may be implemented as or included in the second apparatus 120 in FIG. 1.

In some example embodiments, the second apparatus comprises means for configuring, to a first apparatus, an association between at least one TAG associated with a SpCell of the first apparatus and respective one or more indices in an RAR.

In some example embodiments, the first apparatus is capable of being configured with two TAGs associated with the SpCell.

In some example embodiments, the second apparatus further comprises: means for configuring the association to the first apparatus upon configuring a second TAG for the first apparatus.

In some example embodiments, the second apparatus further comprises: means for configuring the association between a first TAG and a corresponding index in the RAR to the first apparatus when there is no configuration of a second TAG.

In some example embodiments, the second apparatus further comprises: means for configuring, to the first apparatus, a TAG associated with SpCell and an index in the RAR having a specific index value.

In some example embodiments, a lower index value in the RAR is associated to a TAG having a lower group identifier and a higher index value in the RAR is associated to a TAG having a higher group identifier.

In some example embodiments, the second apparatus further comprises: in responding to configuring the TAG having the lower group identifier associated to the higher index value, re-configure the TAG having the lower group identifier associated to the lower index value when configuring the TAG having the higher group identifier.

In some example embodiments, an index in the RAR is indicated by a value of a bit field in the RAR.

In some example embodiments, the first apparatus comprise a terminal device and the second apparatus comprises a network device.

In some example embodiments, the second apparatus further comprises means for performing other operations in some example embodiments of the method 500 or the second apparatus 120. In some example embodiments, the means comprises at least one processor; and at least one memory storing instructions that, when executed by the at least one processor, cause the performance of the second apparatus.

Figure 6:
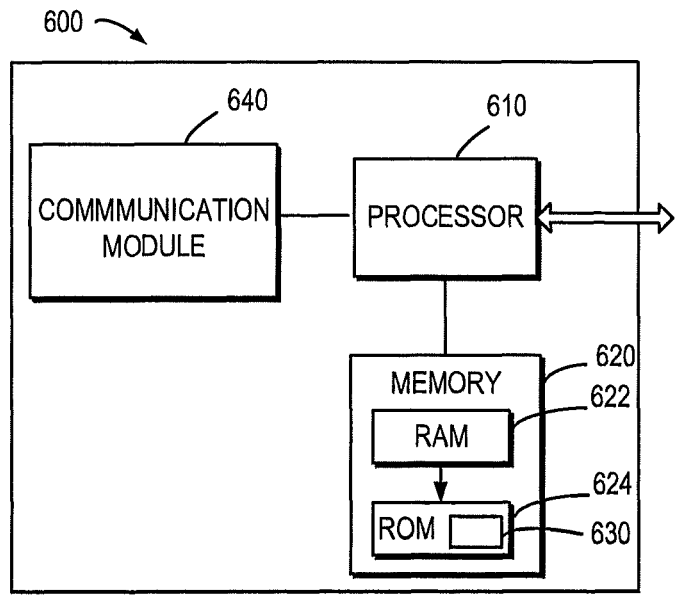
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110 or the second apparatus 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
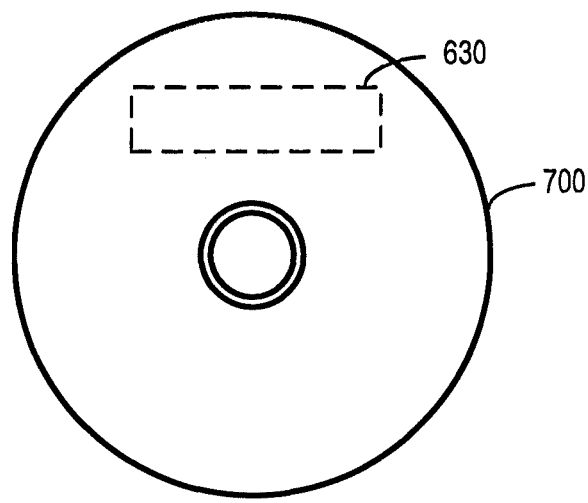
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
   at least one processor; and
   at least one memory storing instructions that, when executed with the at least one processor, cause the first apparatus at least to:
   determine whether an association between at least one timing advance group of two timing advance groups associated with a special cell of the first apparatus and respective one or more indices in a random access response was obtained from a second apparatus, wherein the first apparatus is configured with the two timing advance groups associated with the special cell; and
   determine, based on the determination of the association, an applicability of information in at least one field of the random access response for a random access procedure of the first apparatus.

2. The first apparatus of claim 1, wherein the instructions, when executed with the at least one processor, cause the first apparatus to:
   obtain the association upon configuring a second timing advance group of the two timing advance groups for the first apparatus.

3. The first apparatus of claim 1, wherein the instructions, when executed with the at least one processor, cause the first apparatus to:
   obtain the association between a first timing advance group of the two timing advance groups and a corresponding index in the random access response when there is no configuration of a second timing advance group.

4. The first apparatus of claim 1, wherein the instructions, when executed with the at least one processor, cause the first apparatus to:
in accordance with a determination that a received random access response indicates an index corresponding to a timing advance group of the two timing advance groups associated with the special cell of the first apparatus, determine that the information in at least one field of the random access response is to be applied for the random access procedure and applying the information in at least one field of the random access response for the random access procedure.

5. The first apparatus of claim 1, wherein the instructions, when executed with the at least one processor, cause the first apparatus to:
in accordance with a determination that a received random access response does not indicate an index corresponding to a timing advance group of the two timing advance groups associated with the special cell of the first apparatus, determine that the information in the at least one field of the random access response is not to be applied for the random access procedure and not applying the information in the at least one field of the random access response for the random access procedure.

6. The first apparatus of claim 1, wherein the instructions, when executed with the at least one processor, cause the first apparatus to:
obtain the association between a timing advance group associated with the special cell and an index in the random access response having a specific index value; and
determine that a further timing advance group associated with the special cell is associated to a further index in the random access response having another index value.

7. The first apparatus of claim 1, wherein a lower index value in the random access response is associated to a timing advance group of the two timing advance groups having a lower group identifier and a higher index value in the random access response is associated to a timing advance group of the two timing advance groups having a higher group identifier.

8. The first apparatus of claim 1, wherein an index in the random access response is indicated with a value of a bit field in the random access response.

9. The first apparatus of claim 1, wherein the first apparatus comprises a terminal device and the second apparatus comprises a network device.

10. The first apparatus of claim 1, wherein the instructions, when executed with the at least one processor, cause the first apparatus to perform, based on the applicability, applying the information in the at least one field of the random access response for the random access procedure.

11. The first apparatus of claim 1 wherein, because the one or more indices in the random access response indicate at least an index corresponding to the at least one timing advance group of the two timing advance groups, the applying the information in the at least one field of the random access response for the random access procedure is performed.

12. The first apparatus of claim 1, wherein the association indicates which of the two timing advance groups is applicable to which index value of an indication in a field of the random access response.

13. A second apparatus, comprising:
at least one processor; and
at least one memory storing instructions that, when executed with the at least one processor, cause the second apparatus at least to:
configure, to a first apparatus, two timing advance groups associated with a special cell, and configure, to the first apparatus, an association between at least one timing advance group of the two timing advance groups associated with the special cell of the first apparatus and respective one or more indices in a random access response of a random access procedure; and
participate in the random access procedure with the first apparatus based on information applied in signaling by the first apparatus from at least one field of the random access response for the random access procedure.

14. A method, comprising:
determining, at a first apparatus, whether an association between at least one timing advance group of two timing advance groups associated with a special cell of the first apparatus and respective one or more indices in a random access response was obtained from a second apparatus, wherein the first apparatus is configured with the two timing advance groups associated with the special cell; and
determining, based on the determination of the association, an applicability of information in at least one field of the random access response for a random access procedure of the first apparatus.

15. A non-transitory program storage device readable with an apparatus, tangibly embodying a program of instructions executable with the apparatus at least to perform the method of claim 13.

16. A method, comprising:
configuring, from a second apparatus to a first apparatus, two timing advance groups associated with a special cell, and configuring, with the first apparatus, an association between at least one timing advance group of the two timing advance groups associated with the special cell of the first apparatus and respective one or more indices in a random access response of a random access procedure; and
participating in the random access procedure with the first apparatus based on information applied in signaling by the first apparatus from at least one field of the random access response for the random access procedure.

* * * * *